(12) United States Patent
Tuomi

(10) Patent No.: US 7,120,441 B1
(45) Date of Patent: Oct. 10, 2006

(54) METHOD AND SYSTEM FOR RE-ROUTING A CALL

(75) Inventor: Markku Tuomi, Espoo (FI)

(73) Assignee: Nokia Corporation, Espoo (FI)

( * ) Notice: Subject to any disclaimer, the term of this patent is extended or adjusted under 35 U.S.C. 154(b) by 282 days.

(21) Appl. No.: 10/312,630

(22) PCT Filed: Jun. 29, 2000

(86) PCT No.: PCT/EP00/06093
§ 371 (c)(1),
(2), (4) Date: Mar. 18, 2003

(87) PCT Pub. No.: WO02/01843
PCT Pub. Date: Jan. 3, 2002

(51) Int. Cl.
*H04Q 7/20* (2006.01)
*H04Q 7/38* (2006.01)

(52) U.S. Cl. .......... 455/445; 455/414.1; 455/417; 455/403; 455/422.1; 455/412.1; 455/413; 379/229; 379/230; 379/221.01; 379/219

(58) Field of Classification Search ........ 455/417, 455/414.1, 403, 422.1, 432.1, 433, 445, 500, 455/517, 550.1, 412.1, 412.2, 413, 461; 379/229, 379/230, 221.01, 219
See application file for complete search history.

(56) References Cited

U.S. PATENT DOCUMENTS 5,966,653 A * 10/1999 Joensuu et al. .......... 455/445
6,134,316 A * 10/2000 Kallioniemi et al. .. 379/220.01
6,381,459 B1 * 4/2002 Gervens et al. .......... 455/445
6,856,598 B1 * 2/2005 Stanfield .................. 370/235
2002/0051528 A1 * 5/2002 Shepherd ................. 379/230

FOREIGN PATENT DOCUMENTS

| EP | 0 740 480 A2 | 10/1996 |
| WO | WO 99/01976 | 1/1999 |
| WO | WO 00/51327 | 8/2000 |

OTHER PUBLICATIONS

"The Intelligent Network -Changing the Face of Telecommunications", by Richard B. Robrock II, Proceedings of the IEEE, US, IEEE, New York, vol. 79, No. 1, 1991, pp. 7-20, X000208127 ISSN: 0018-9219.

* cited by examiner

*Primary Examiner*—Keith Ferguson
(74) *Attorney, Agent, or Firm*—Squire, Sanders and Dempsey, LLP

(57) ABSTRACT

The present invention relates to a method and system for re-routing a call which has been routed from a calling party (1) through a communication network to a destination (4). A need to relay the call to another destination (5) is identified and a subscriber identification of the calling party (1) is signaled from the other destination back to the communication network using a call drop-back function. Preferably, the subscriber information is then used to derive a routing information of the other destination (5) which may be a right destination in case the initial destination (4) was a wrong destination. Thus, a call drop-back feature is used to route calls even in cases where a subscriber is connected to a wrong destination. Thereby, an effective re-routing can be provided in cases where a subscriber identification is not provided in the call, such that a single service access short code can be used by all subscribers irrespective of their mobile terminal and their location.

24 Claims, 3 Drawing Sheets

METHOD AND SYSTEM FOR RE-ROUTING A CALL

BACKGROUND OF THE INVENTION

1. Field of the Invention

The present invention relates to a method and system for re-routing a call which has been routed from a calling party through a communication network to a destination, wherein the call needs to be relayed from the destination to another destination, as for example in case of a wrong destination such as a wrong message server.

2. Description of the Prior Art

Recently, the features offered by communication networks in connection with so-called value added services have remarkably increased. Among such features, a feature has been developed which permits a calling subscriber to leave a message on a message server for the called subscriber, in case the called subscriber cannot be reached. The called subscriber may then listen to the message which has been left at any later point of time. Thus, such a message server has a function of an answering machine provided at the communication network side.

According to the prior art, several related services have been proposed.

The U.S. Pat. No. 4,930,152 discloses a call return telephone service, wherein a list of the telephone numbers of calling subscribers is kept in a switch (exchange) of the network for the purpose of calling back previously calling subscribers. However, specific messages having a content defined by the calling subscriber cannot be stored for the called subscriber.

Furthermore, EP-A-0 795 992 discloses a method and apparatus for providing a prepaid return call in connection with a message server. The called subscriber as the recipient of messages stored in the message server is not enabled to initiate a listening operation for reading the contents of a message stored for him. Instead, the message server periodically tries to contact the called subscriber in order to deliver the stored message. Thus, the message may never be delivered to the called subscriber.

Additionally, EP-A-0 897 239 discloses a program-controlled communication system, having access to a voice mail server. According to this prior art, a called subscriber may retrieve messages intended for the subscriber from the voice mail server. A calling subscriber may then automatically be called back upon retrieval of the corresponding message. However, such a call back mechanism does not allow a direct call back from the called to the (previously) calling subscriber, since only pre-stored messages are exchanged with an interaction of the message service being involved between the called and the calling subscriber or vice versa.

To enhance the proposed call back mechanisms, a call drop-back function or mechanism has been proposed so as to enable a called subscriber to make a call back call to several different calling subscribers during a single message server session. To achieve this, required information is transmitted between the message server and the exchange or switching center in a call drop-back message using different parameters, that is a call drop-back type indicator indicating if a re-establishment of the listening call to the message server is needed after the call back call is terminated, a call drop-back release reason indicator indicating whether the call back call to the subscriber has been successful or not, and a message server session indicator containing a subscriber identification of the called subscriber and a message identification identifying the message listened to, so as to enable a resumption of the listening call after the call back call has been terminated.

The above call drop-back mechanism leads to the advantage that a called subscriber listening to recorded messages is enabled to carry on listening to his messages after a call back call to the subscriber who has left that message, without the need to make a new call to the message server afterwards. Thus, signaling load in the network can be reduced.

However, an initial direct routing to the right message server may not be possible for example when the subscriber is calling from abroad and the CLI (Calling Line Identification) is not available, or a subscriber not using the own mobile terminal uses a so-called "common access number" to access the message services, such that a HLR interrogation or enquiry for obtaining the subscriber identity is not possible.

In case a message server is accessed via an unstructured data service such as the USSD (Unstructured Supplementary Service Data) service, several message servers may be connected to the same USSD center (USSDC), such that it is quite possible that the call will be connected to a wrong message server.

SUMMARY OF THE INVENTION

The present invention is a method and system for effectively re-routing a call which needs to be relayed due to for example an initial wrong destination.

A method for re-routing a call which has been routed from a calling party through a communication network to a destination, in accordance with the invention comprises the steps of identifying a need to relay the call to another destination, and signaling a subscriber identification of the calling party from the destination back to the communication network using a call drop-back function.

Additionally, a system or network element for re-routing a call which has been routed from a calling party through a communication network to a destination in accordance with the invention comprises, signaling means for identifying a need to relay the call to another destination and signaling a subscriber identification of the calling party from the destination back to the communication network using a call drop-back function.

Accordingly, the subscriber identification is delivered or dropped back to the network by using the call drop-back function. Then, the communication network may use this information to derive a corresponding routing information of the other destination, such that the call can then be routed to the other, for example desired or right destination. Since the call drop-back function is used, the connection between the calling party and the network can be maintained so as to achieve an effective routing from the initial destination to the other destination. Thereby, a single service access short code can be used by all subscribers even in case the subscribers are calling from abroad or the CLI is not available. Moreover, the single service access short code can be used when the subscribers do not use their own mobile terminal to access a message server. This leads to a more efficient service marketing due to the use of single service access short codes. Moreover, the capability to derive the right destination (for example home message server node) of any subscriber is not required at the destination, since the re-routing is initiated by the call drop-back function provided by the network.

Furthermore, mailboxes or other message storing facilities of the subscriber may be transferred from one message server node to another by simply changing the corresponding routing information in the respective HLR of the subscriber.

The signaled subscriber identification may be used to derive a routing information of the right destination, and the call may be routed to the other destination based on said routing information.

Preferably, the destinations, for example wrong and right destinations, are message servers. In this case, the call may be a message server access via an unstructured data service. The subscriber identification may be obtained from the calling party by using the unstructured data service, such as the USSD service. Thus, the required subscriber identification or re-directing number can be delivered to the wrong destination (wrong message server) by the subscriber, upon request, by typing it to his or her terminal according to corresponding instructions delivered via the USSD channel.

Preferably, the subscriber identification may be signaled by using a call drop-back release message. In particular, the call drop-back type parameter of the call drop-back release message may be set to a predetermined value indicating the re-routing operation. Thus, if the network receives a call drop-back release message with a call drop-back type parameter having the predetermined value, the network is initiated or informed so as to perform the re-routing operation by deriving the required routing information. The subscriber identification may be an MSISDN. The routing information may be a Routing Category of the subscriber derived by a HLR enquiry. In this case, the HLR enquiry does not lead to a reservation of an MSRN. The HLR enquiry may be performed by a switching center of the communication network.

Preferably, the system may comprise a communication means for obtaining the subscriber identification from the called party by using the unstructured data service.

Furthermore, the signaling means may be arranged to or set the call drop-back type parameter to the predetermined value indicating the re-routing operation.

In the system, the deriving means may be the switching center of the communication network.

The network element may be a message server, for example a Voice Mail Server.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
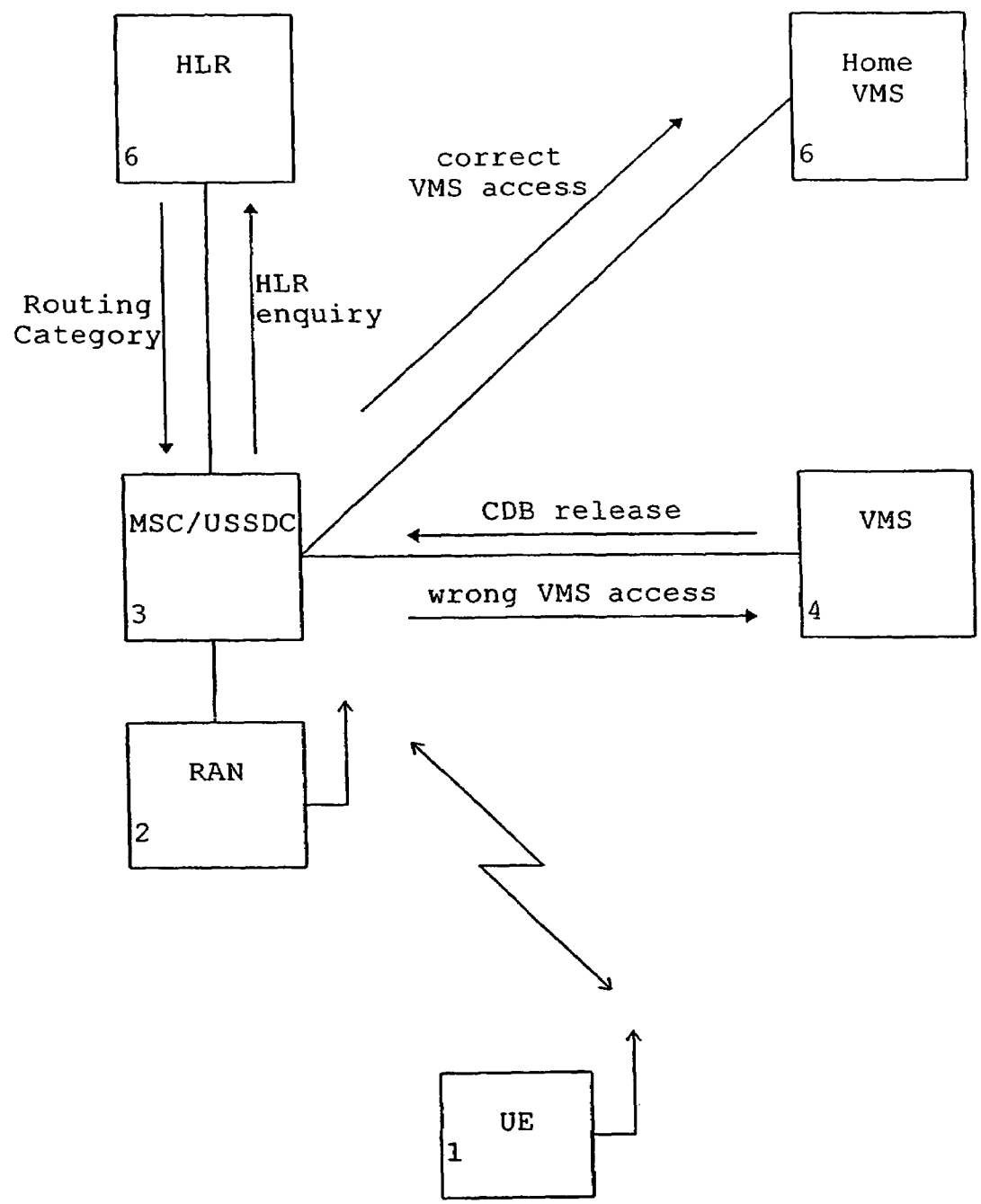
FIG. 1 shows a basic block diagram of a GSM or UMTS network, in which the preferred embodiment of the present invention can be implemented.

The preferred embodiment of a method and system according to the present invention are now be described on the basis of a GSM (Global System for Mobile Communication) or UMTS (Universal Mobile Telecommunications System) network as shown in FIG. 1.

According to FIG. 1, a user equipment (UE) 1, which may be a mobile station or terminal, is connected via a radio interface to a radio access network (RAN) 2 such as a base station subsystem or a UMTS Terrestrial Radio Access Network (UTRAN). The UE 1 consists of physical equipment used by a subscriber of the mobile network and comprises the SIM (subscriber identity module). The RAN 2 is connected to a mobile switching center (MSC) 3 having the function of a USSD center, such that a handling and switching of USSD messages is possible in the MSC 3. The RAN 2 is a system of base station equipment (transceivers, controllers etc.) which is viewed by the MSC 3 through a single A interface as being the entity responsible for communicating with mobile stations in a certain area. The radio equipment of the RAN 2 may support one or more cells. The RAN 2 may consist of one or more base stations.

The MSC 3 constitutes the interface between the radio system and the fixed networks. The MSC 3 performs all necessary functions in order to handle the calls to and from the user equipment or mobile stations. Usually, the MSC 3 has to interface several base stations so as to cover a given geographical area. In addition, several, MSCs may be provided to achieve the whole network coverage.

Furthermore, a Home Location Register (HLR) 6 is provided as a database in charge of the management of mobile subscribers. The network may contain one or several HLRs, depending on the number of mobile subscribers, on the capacity of the equipment and on the organization of the network. In particular, two kinds of information are stored in the HLR 6: a subscription information and some location information enabling the charging and routing of calls (for example the roaming number, the Visitor Location Register (VLR) address, the MSC address, the local identities). In particular, two types of numbers are attached to each mobile subscriber and stored in the HLR 6: an International Mobile Subscriber Identity (IMSI) and one or more Mobile Station International ISDN numbers (MSISDN). These numbers may be used as a key to access the subscriber information stored in the database.

Furthermore, the MSC 3 is connected to message servers, for example Voice Mail Servers (VMS) 4, 5, wherein a home VMS 5 indicates the message server at the home network of the UE 1. In the VMSs 4, 5, a message record or database is partitioned to subscriber partitions. A partition may be identified by the subscriber's telephone number MSISDN. In a more secure manner, it may be identified by a personal identification code such as a PIN number and/or a combination thereof. Within each such partition, a call number indicating the number of a call, and a calling subscriber identity indicating the identity of the calling subscriber (for example his or her telephone number) are stored in association with a memory area of the message record allocated for storing messages left by a calling subscriber for the called subscriber. Furthermore, a call drop-back release reason indicator is stored in association with each message so as to indicate whether a call back call has been established and performed with success. In a minimum solution, this indicator may be a flag indicating whether a subscriber was successful in calling back a calling subscriber. However, a higher number of bits may be provided for the coding of this indicator.

In the case shown in FIG. 1, a VMS service access is performed by the UE 1 using the USSD service. To achieve this, the subscriber dials at the UE 1 a short code, so as to access the home VMS 5. However, for the reasons indicated above, the CLI may be not available. Thus, the USSDC function in the MSC 3 receives a call with an unknown subscriber identity and routes it to the VMS 4, that is to the wrong message server.

According to the preferred embodiment, a new call dropback (CDB) Type parameter is introduced in the CDB release message so as to signal a re-routing operation to a home message server. The subscriber identification (for example MSISDN) required for this CDB release message is obtained by the VMS 4 after recognizing that the listening call has been directed to a wrong message server. Then, the VMS 4 contacts the UE 1 via the USSD channel and requests the identity of the requested voice box which the caller is trying to reach. The subscriber of the UE 1 then types this information to his terminal according to the instructions delivered so as to signal it via the USSD channel to the VMS 4. Then, the VMS 4 retrieves the subscriber identification or redirecting number (i.e. MSISDN) from the subscriber's response message and issues a CDB release message with the subscriber identification and a CDB Type parameter indicating the re-routing operation to the MSC 3. Based on this CDB release message, the MSC 3 is informed or instructed to use the subscriber's identification or redirecting number for a special HLR enquiry at the HLR 6 of the subscriber, which does not lead to a reservation of an MSRN (Mobile Subscriber Roaming Number) but only to a return of the subscriber's Routing Category which is stored in the HLR 6 together with the CLI and which is used for identifying the right home VMS 5. Then, based on the received Routing Category, the MSC 3 may route the call to the home VMS 5.

It is noted, that, during above described call drop-back operation, the connection between the UE 1 and the MSC 3 is not released. Thus, the re-routing to the right home VMS 5 can be performed without a new establishment of the connection, that is the subscriber at the UE 1 does not have to perform a new dialing operation.

Figure 2:
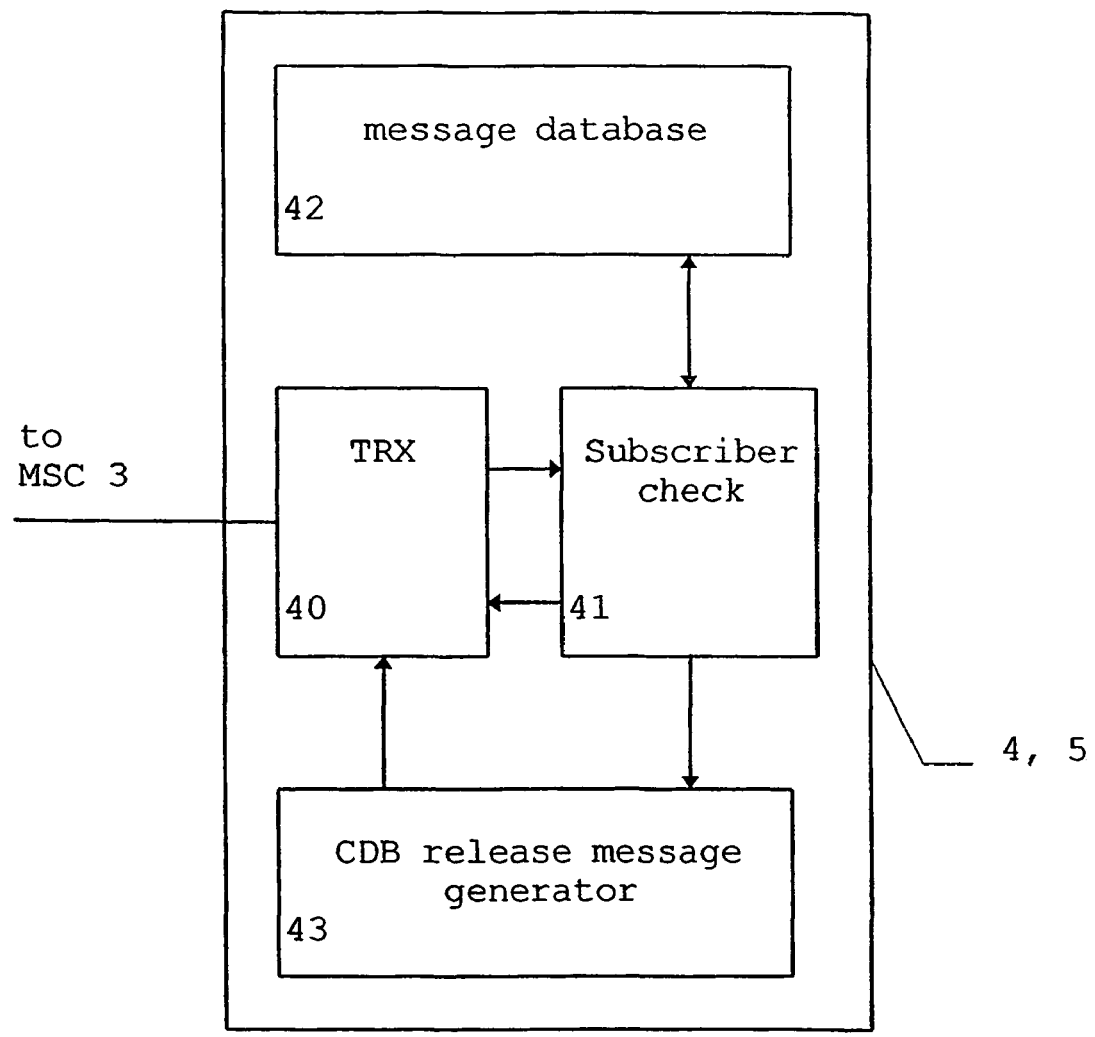
FIG. 2 shows a basic block diagram of a message server according to the preferred embodiment of the present invention.

FIG. 2 shows a basic block diagram of a message server such as the VMS 4 or the home VSM 5. It is noted that only those blocks essential for the present invention are shown in FIG. 2.

According to FIG. 2, the message server comprises a transceiver (TRX) 40 for transmitting and receiving messages, calls and/or data to/from the network. Calls received from the network are supplied to a subscriber check unit 41 arranged to check whether the mail box access has been routed to the right VMS. This may be achieved on the basis of the CLI number identifying the mail box to be accessed in the VMS node. If the subscriber can be identified in the subscriber check unit 41 and the VMS is the right message server, the corresponding voice message is retrieved from a message database 42 and transmitted via the network to the subscriber.

On the contrary, if the subscriber cannot be identified in the subscriber check unit 41, a data communication is established via for example a USSD channel to the subscriber so as to request the identity of the voice box. Having received the voice box identity, the subscriber check unit 41 supplies the subscriber identification (for example MSISDN) as a redirecting number to a CDB release message generator 43 which sets the CDB Type indicator to a value indicating a re-routing operation and transmits the CDB release message with the redirecting number or the subscriber identity via the TRX 40 to the MSC 3.

Figure 3:
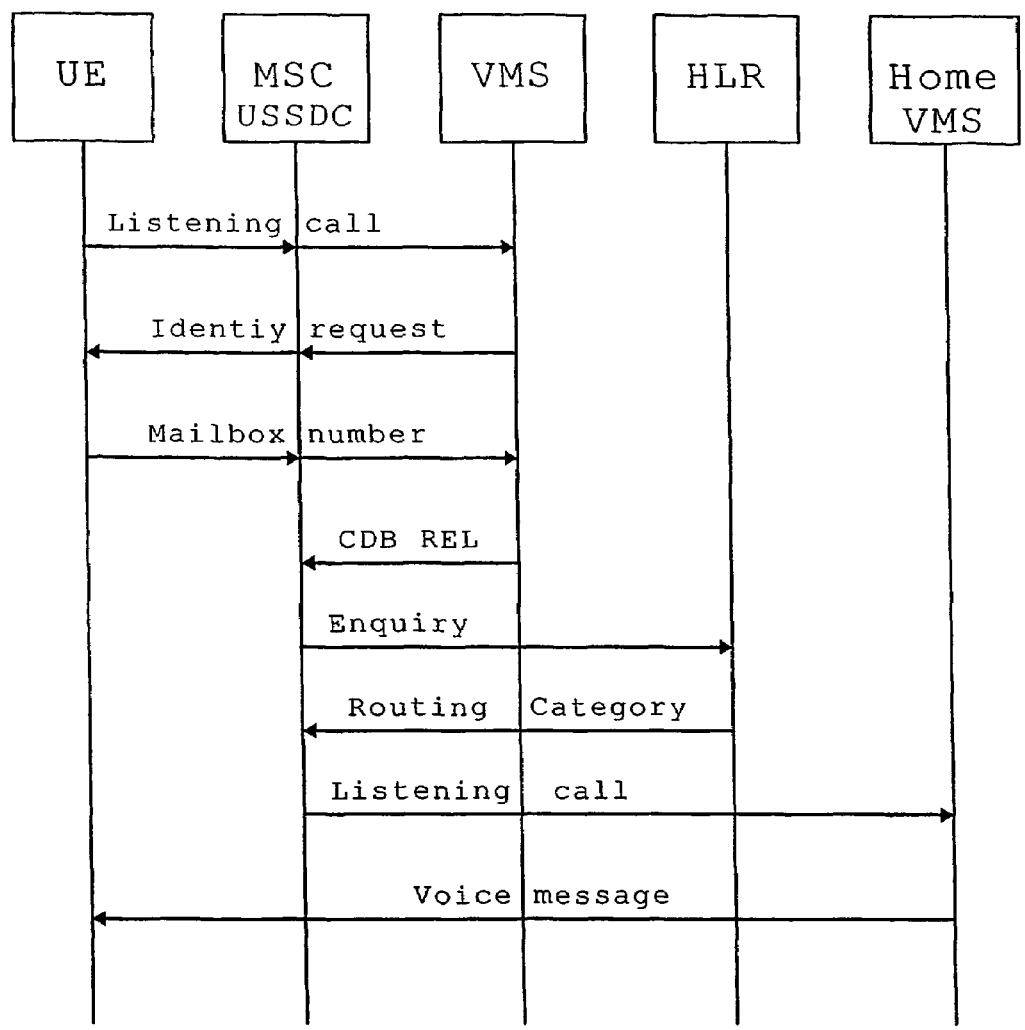
FIG. 3 shows a signaling diagram indicating basic signaling or message flows required for the re-routing operation according to the preferred embodiment of the present invention.

FIG. 3 shows a signaling diagram which indicates the above mentioned re-routing based on the call drop-back message.

According to FIG. 3, a listening call is transmitted via a USSD channel from the UE 1 via the MSC 3 to the wrong VMS 4, since the subscriber identity is not available at the MSC 3. This is recognized by the subscriber check unit 41 of the VMS 4 which then issue an identification request via the USSD channel to the UE 1. In response thereto, the UE 1 signals the voice mailbox number including the subscriber identity to the VMS 4. Having received the voice mailbox number, the subscriber check unit 41 controls the CDB release message generator 43 so as to issue a CDB release message indicating a message re-routing operation with the received subscriber identity to the MSC 3. In response to this CDB release message, the MSC 3 initiates a special HLR enquiry requesting the subscribers Routing Category based on the received subscriber identity from the HLR 6. The HLR 6 returns the subscriber's Routing Category to the MSC 3. During the above signaling operations, the connection between the UE 1 and the MSC 3 has not been released, such that the voice mail access may now be routed to the right home VMS 5 via a corresponding USSD connection, such that the subscriber may receive the requested voice mail.

In summary, the present invention relates to a method and system for re-routing a call which has been routed from a calling party 1 through a communication network to a wrong destination 4. A need to relay the call to another destination 5 is identified and a subscriber identification of the calling party 1 is signaled from the other destination back to the communication network using a call drop-back function. Preferably, the subscriber information is then used to derive a routing information of the other destination 5 which may be a right destination in case the initial destination 4 was a wrong destination. Thus, a call drop-back feature is used to route calls even in cases where a subscriber is connected to a wrong destination. Thereby, an effective re-routing can be provided in cases where a subscriber identification is not provided in the call, such that a single service access shortcode can be used by all subscribers irrespective of their mobile terminal and their location.

It is noted that the described re-routing operation based on a call drop-back function using the subscriber's Routing Category could be implemented any communication network having a possibility of routing a call to a first destination and having a call drop-back type feature. For instance, the first destination to which the call is first routed before call drop-back is not necessarily a wrong destination. It may also be a destination which for example wants to forward the call and does not know whereto. The communication system may be any network having at least one switching center or exchange for switching calls between a subscriber and a destination such as a message server. Thus, the communication system may be any fixed or mobile telecommunication system. The message server may store any kind of messages such as voice messages, text messages, SMS (Short Message Service) messages or other data messages. Furthermore, the call drop-back feature may be any feature or service offered by the communication network so as to enable a called subscriber listening to a message registered for him to initiate a direct call to a respective calling subscriber who has left the respective message at the server. Therefore, the above description of the preferred embodiment and the accompanying drawings are only intended to illustrate the present invention. The preferred embodiment of the invention may thus vary within the scope of the attached claims.

What is claimed is:

1. A method for re-routing a call which has been routed from a calling party through a communication network to a first message server, said method comprising the steps:
   said first message server identifying a need to relay the call to a second message server which is a message server at a home network of the calling party;
   said first message server retrieving a subscriber identification from said calling party;
   said first message server signaling said subscriber identification back to said communication network using a call drop-back function;
   said signaled subscriber identification being used to derive routing information of said second message server; and
   said call being routed to said second message server based on said routing information.

2. A method according to claim 1, wherein said call is a message server access via an unstructured data service.

3. A method according to claim 1, wherein said subscriber identification is obtained from said calling party by using an unstructured data service.

4. A method according to claim 3, wherein said unstructured data service is a USSD-service.

5. A method according to claim 1, wherein said subscriber identification is signaled by using a call drop-back release message.

6. A method according to claim 5, comprising the step of setting a call drop-back type parameter of said call-drop release message to a predetermined value indicating a re-routing operation.

7. A method according to claim 1, wherein said subscriber identification is an MSISDN.

8. A method according to claim 1, wherein said routing information is a routing category of the subscriber derived by an HLR inquiry.

9. A method according to claim 8, wherein said HLR enquiry does not lead to a reservation of an MSRN.

10. A method according to claim 8, wherein said HLR enquiry is performed by a switching center of said communication network.

11. A method according to claim 1 wherein, said first message server is further adapted to store messages left by calling subscribers but is not adapted to store messages for the calling party.

12. A system comprising:
   a network element for re-routing a call;
   a communication network;
   a first message server; and
   a second message server; and wherein
   said network element re-routes the call which has been routed from a calling party through the communication network to the first message server which is adapted to store messages left by calling subscribers but is not adapted to store messages for the calling party, said network element comprising signaling means for identifying a need to relay the call to the second message server which is adapted to store messages for the calling party, and said network element being adapted to retrieve a subscriber identification from said calling party, and to signal a subscriber identification of said calling party from said first message server back to said communication network using a call drop-back function.

13. A system according to claim 12, wherein said network element is a Voice Mail Server.

14. A system according to claim 12, wherein said call is a message server access was an unstructured data service.

15. A system according to claim 12, wherein said subscriber identification is obtained from said calling party by using an unstructured data service.

16. A system according to claim 15, wherein said unstructured data service is a USSD-service.

17. A System according to claim 12, wherein said subscriber identification is signalled by using a call drop-back release message.

18. A system according to claim 17, wherein the system sets a call drop-back type parameter of said call-drop release message to a predetermined value indicating a re-routing operation.

19. A system according to claim 12, wherein the subscriber identification is an MSISDN.

20. A system according to claim 12, wherein said routing information is a routing category of the subscriber derived by an HLR inquiry.

21. A system according to claim 20, wherein said HLR inquiry does not lead to reservation of an MSRN.

22. A system according to claim 20, wherein said HLR inquiry is performed by a switching center of said communication network.

23. A network element for use in a system including a network element for re-routing a call, a communication network, a first message server which is adapted to store messages left by calling subscribers but is not adapted to store messages for the calling party, and a second message server which his adapted to store messages for the calling party, said network element comprising:
   means for re-routing the call which has been routed from a calling party through the communication network to the first message server;
   signaling means for identifying a need to relay the call to the second message server; and
   means for retrieving a subscriber identification from said calling party and to signal a subscriber identification of said calling party from said first message server back to said communication network using a call drop-back function.

24. A network element according to claim 23, wherein said network element is a Voice Mail Server.

* * * * *